United States Patent [19]
Hoyt et al.

[11] Patent Number: 5,791,770
[45] Date of Patent: Aug. 11, 1998

[54] LIGHT SOURCE COOLER FOR LCD MONITOR

[75] Inventors: Stephen O. Hoyt, Sanbornton; Richard R. Gagnon, Northfield, both of N.H.

[73] Assignee: Aavid Thermal Products, Inc., Concord, N.H.

[21] Appl. No.: 807,583

[22] Filed: Feb. 27, 1997

[51] Int. Cl.⁶ .................................................. F21V 29/00
[52] U.S. Cl. ...................... 362/294; 362/218; 362/373
[58] Field of Search ............................ 362/218, 294, 362/373, 264

[56] References Cited

U.S. PATENT DOCUMENTS

| | | | |
|---|---|---|---|
| 3,330,130 | 7/1967 | Schraith et al. | 362/218 |
| 5,099,403 | 3/1992 | Turner | 362/294 |
| 5,161,884 | 11/1992 | Siminovitch | 362/294 |
| 5,321,595 | 6/1994 | Jacobi et al. | 362/294 |

*Primary Examiner*—Thomas M. Sember
*Attorney, Agent, or Firm*—Cohen, Pontani, Lieberman & Pavane

[57] ABSTRACT

A cooling device for a liquid crystal display monitor has a sealed container within which a light source is immersed in a thermally-conductive liquid coolant. The container is rigid and includes a transparent panel through which light travels from the light source to a display screen of the monitor. The liquid coolant transfers heat from the light source to the walls of the container, where it is transferred to the ambient environment. A flexible bladder is provided within the container, which is compressed by coolant volume increases resulting from heating of the coolant by the light source, thereby to protect the container from internal pressure stress. The bladder, filled with an easily compressible fluid, can be vented to the ambient environment, or can be fully contained within the container.

14 Claims, 4 Drawing Sheets

LIGHT SOURCE COOLER FOR LCD MONITOR

BACKGROUND OF THE INVENTION

1. Field of the Invention

This invention relates to compact cooling apparatus and, in particular, to liquid based cooling apparatus.

2. Description of the Related Art

Computers are often used with monitors or displays. These monitors typically provide good black and white or color images if the area where the display is located is not too bright. However, if the ambient light directed at the display is too bright, then glare, or light reflected from the screen, can make it tiresome to view the information displayed on the screen. In severe lighting environments, such as outdoors and/or in direct sunlight, it can be nearly impossible to see what is displayed on the screen. Furthermore, the low back-lighting of these displays often makes it difficult to read them when viewing the display screen at an angle.

One type of computer monitor, which is attractive for its compactness and light weight, is a back-lit liquid crystal (LC) display. A light source, usually located behind the display's liquid crystal panel, emits light which must pass through the panel out towards the user. There is usually a diffuser located between the light source and the LC panel to provide uniform back lighting so that the user can not see the light source behind the LC panel.

If more light was emitted by the light source behind the display screen, the signal (information displayed on the screen) to noise (glare) ratio could be significantly improved. This would, in turn, make it easier, and possible in even the brightest locations, to view what is displayed. The increased light would also allow viewing of the screen from a wider angle relative to a position directly in front of the screen. However, to increase the light emitted through the LC panel would require a much brighter back lighting source than is presently used.

The use of a brighter light source presents several problems. A first problem is that increasing the amount of light transmitted through the screen also significantly increases the amount of thermal energy absorbed by the LC panel. This prolonged, excessive thermal exposure can cause the LC panel to fail.

A second problem with significantly increasing the amount of emitted light is that the risk of the light source overheating also increases. To avoid such overheating, a large amount of heat must be dissipated to the outside of the monitor or display cabinet. Conventional heat transfer devices are simply not equipped to handle such a high volume of thermal energy in such a compact environment.

A third problem with increasing the power of the light source is that as the temperature of the light source increases beyond a certain point, the efficiency of the light source (i.e. the light emitted relative to the power consumed) decreases. Furthermore, the elevated temperature reduces the life span of the light source, such that the mean time between failures is lower with elevated temperatures.

U.S. Pat. No. 3,330,130 to Schraith, et al. teaches a cooling device for a fluorescent lamp. However, the system is clearly too bulky for an LC display, and lacks the heat transfer characteristics necessary to dissipate enough heat to cool a light source bright enough to provide the desired back lighting.

SUMMARY OF THE INVENTION

The present invention provides a cooling system for a light source, particularly a light source for an LC display. The cooling system uses a container within which the light source is located. The container also contains a coolant which fills substantially all of the space in the container not taken up by components of the cooler. The coolant has a boiling point higher than the highest operating temperature of the light source for all ambient pressures within which the device operates. Thus, the cooling system operates as a "single-phase" system, that is, the heat from the light source is transferred by conduction to the fluid, by natural convection circulation to the outer walls of the container, and then to an external ambient environment by convection of air past the outer walls.

The coolant container is positioned so that light emitted from the light source within impinges on the display screen. Preferably, the container is a rigid structure, with a transparent or translucent glass or plastic front window through which light passes from the light source to the display screen. The window is hermetically sealed to a rigid metal container which defines a space within which the light source is located. The coolant in the container is preferably selected to have the characteristics of an infrared (IR) and/or ultraviolet (UV) filter, blocking infrared light directed toward the display screen while remaining translucent to visible light. Thus, the container blocks the thermal radiation in the IR, thereby protecting the display screen while allowing the visible light, to the illumination.

During operation of the light source, the liquid coolant in the container absorbs heat from the light source, and is also heated by the absorption of infrared light from the light source traveling through the container. This heat is conveyed through the coolant fluid by conduction, and is dissipated through the walls of the container to the ambient air by convection. Pins or fins may be used on the outside of the container to increase the surface area from which heat is dissipated, thereby to increase heat dissipation. These pins may be formed directly into the surface of the container, or may be separate, and attached to an outer surface of the container in any conventional manner. Pins are used in the preferred embodiment. In one embodiment, the fins are formed of a single piece of thermally-conductive material which is folded into a corrugated shape to form multiple extending fins.

In the preferred embodiment, the light source is a fluorescent tube which is positioned within the container and immersed in the liquid coolant. This configuration allows cooling of the entire light source surface, and direct contact between the light source and the coolant for better heat transfer. A dielectric coolant is preferred to prevent electrical shorting. Also located within the container is a flexible bladder containing a compressible gas. The bladder occupies a certain amount of space within the container at an ambient temperature. As the light source temperature increases, and heats the surrounding coolant, the coolant expands. However, the flexibility of the bladder is such that the bladder and gas contained therein are easily compressed by the expanding coolant, thereby providing increased volume for the expanding coolant. The compressible bladder prevents any significant pressure increase to occur within the rigid surrounding container which might place stress on the surrounding container.

The bladder is hollow, and has a vent to the external environment. This allows gas, usually air, within the bladder to be forced out of the bladder and into the external environment when the heating and volumetric expansion of the coolant causes compression of the bladder. Conversely, the vent will also allow air to be drawn into the bladder when the unit cools or is subjected to temperatures below ambient as the fluid will contract, thus allowing the bladder to expand.

DETAILED DESCRIPTION OF THE PREFERRED EMBODIMENTS

Figure 1:
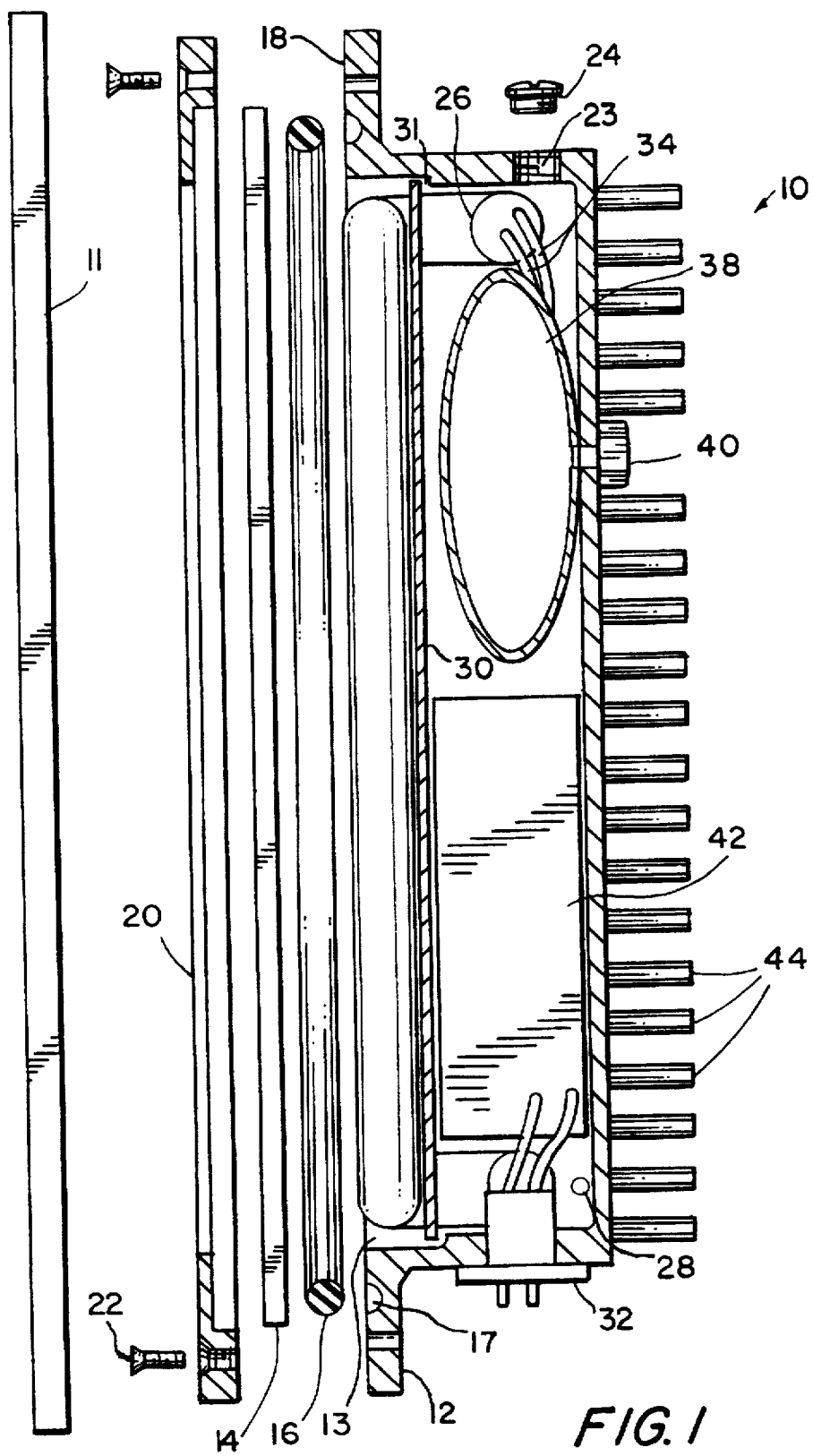
FIG. 1 is a partially exploded cross-sectional side view of a light source cooler according to the present invention.

Shown in FIG. 1 is a light source cooler 10 according to the present invention which is particularly well-suited for use in cooling the light source of a liquid crystal display monitor 11. FIG. 1 is depicted in cross section to show all of the components of the cooler 10. The cooler 10 comprises a rigid container 12 and a transparent panel 14. The container 12 defines the interior space of the enclosure, and has one open side 13 facing the front of the display monitor 11. The container 12 preferably is of a single-piece construction. It can be a machine part, cast from molten material or even stamped out of a desired metal material thereby simplifying the manufacturing process. The open side 13 of the container 12 is covered by a transparent panel 14, which is tightly sealed to the container 12.

In the preferred embodiment, a gasket, such as an O-ring 16 is located in the groove 17 of flange 18 of the container 12, and is compressed between the flange 18 and the panel 14 by cover 20 which is secured to container 12 with screws 22. The clamping of the container 12 and panel 14 together with intermediate O-ring 16 provides a hermetic seal that prevents fluid leakage from the container 12.

Figure 2:
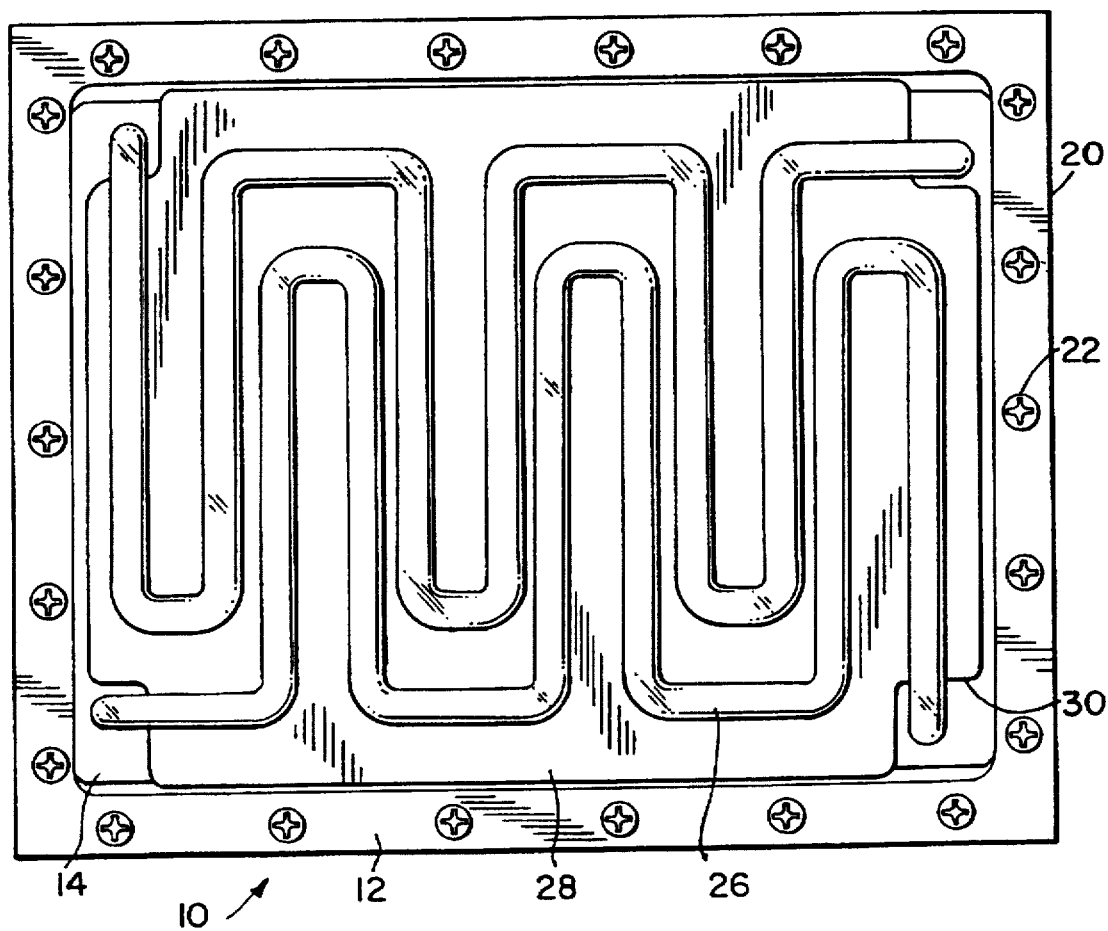
FIG. 2 is a front view of the cooler shown in FIG. 1.

FIG. 2 is a front view of the cooler 10 showing transparent panel 14 sealed to the front of container 12. The light source, bulb 26, is a serpentine fluorescent bulb positioned within the container 12, so as to provide a fairly even distribution of light across the surface of the panel 14. The bulb is located adjacent the panel 14 with no obstruction between the bulb and panel which might otherwise block light from the bulb 26 from exiting through the panel 14. The space within the container 12 (other than that taken up by the components of the cooler) is filled with a liquid coolant 28, so that no pockets of vapor exist within the container 12. Thus, in any orientation of the cooler 10, the entire surface of the bulb 26 is in contact with the coolant 28.

While the bulb 26 is operating, heat from the bulb 26 is transferred, by conduction, to the coolant 28 which, in turn, transfers the heat to the sides of the container, and then to the external ambient environment. In the preferred embodiment, the coolant 28 is a good thermal conductor with a boiling point higher than the highest operating temperature of the bulb 26 in any expectable ambient pressure. Thus, the cooler 10 operates only in single phase (i.e. liquid phase).

Figure 3:
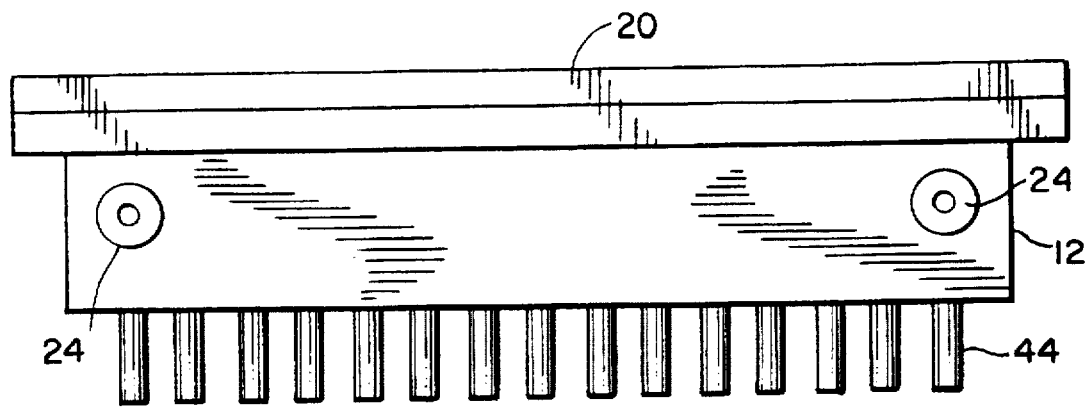
FIG. 3 is a top view of the cooler showing the seal screws.
Figure 4:
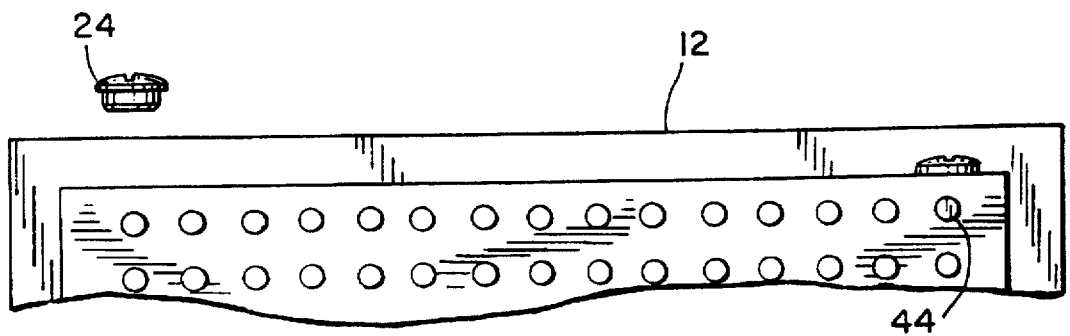
FIG. 4 is a back view of the cooler showing one seal screw removed.

As shown in FIGS. 1, 3 and 4 fill ports 23 are located in the rear surface of container 12, and two fill plugs 24 are provided which have threads and optional integral O-ring which mesh with threads in the fill ports 23 to seal the container when they are tightened. During system set-up, the container 12 is filled with liquid coolant through the fill ports 23. The container 12 is then sealed by tightly screwing fill plugs 24 into the fill ports 23. The fill plugs 24 may be subsequently unscrewed and later resealed if it becomes necessary to replace the liquid coolant 28.

Referring again to FIG. 1, the bulb 26 has insulated electrical wires 34, which provide electrical current through the sealed ends of the bulb 26. The opposing ends of wires 34 are connected to an invertor 42 which optionally is positioned within the container 12. The wires 34 extend through a wall of container 12 via a hermetic electrical pass-through wire plug 32.

Directly behind (i.e. further from the panel 14 than) bulb 26 is secured a reflective plate 30. In one embodiment an Alzak plate is used as plate 30 as it is a well-known reflective surface commonly used with light sources. It redirects the light emitted from the back side of the bulb 26 towards the panel 14. The secure positioning of the reflective plate 30 also provides added support to the bulb 26, which attaches to the reflective plate 30 in the preferred embodiment.

In operation, the cooler 10 is typically located within the cabinet (not shown) of a liquid crystal display monitor 11. The cooler 10 is oriented with the panel 14 facing a display screen of the monitor, such that light from the bulb 26 within the container 12 passes through the panel 14 (and any diffusion means which may be provided with the monitor 11) and is incident upon the display screen to provide the desired backlighting for the monitor 11. When the monitor 11 is activated, the bulb 26 is powered via an electrical current supplied through wires 34 and inverter 42. As the bulb 26 begins emitting light, its temperature rises. This heat from the bulb 26 is transferred to the coolant liquid 28 via conduction. The heat absorbed by the coolant is, in turn, transferred to the surfaces of the container 12, where it is drawn away from the container surfaces such as by convection to the ambient environment.

In the preferred embodiment, the process of convection is aided by the use of a pin array 44 attached to the back surface of the container 12. For clarity, only a portion of the pin fins of the array are labeled by a reference numeral in the figures. The pin array 44 is a thermally-conductive set of fins which draw heat from the container by conduction, and provide an extended surface area from which the heat is transferred to the ambient environment by convection. The pin array may be attached in any of a number of ways but, in the preferred embodiment, the pins are part of the cast or formed housing.

Referring again to FIG. 1, a bladder 38 is located within the container between the reflective plate 30 and the back surface of the container 12. Due to the positioning of the reflective plate 30 against lip 31 of container 12, there is no compressive stress on the bladder 38 from either the reflective plate 30 or the bulb 26. However, the bladder 38 is surrounded by the liquid coolant 28 which fills the remaining space in the container. As the bulb 26 heats, the increase in temperature of the liquid coolant 28 within the container causes the coolant to expand. This expansion of the coolant generates a compressive stress on the bladder 38, which forces air within the bladder 38 to be vented through pressure relief valve 40 to the ambient environment.

The bladder 38 is made of a flexible material which is easily compressed by the expansion of the coolant 28, as described above. This flexibility is sufficient to permit the expanding coolant 28 to compress the bladder 38 well before any significant stress is generated on the surfaces of the container 12. Thus, any pressure increase within the container 12 is negligible. As such, the container 12 is protected from any significant internal pressures which might otherwise weaken the structure and possibly result in coolant leakage. When the monitor 11 is inactivated, and the bulb 26 cools, the coolant also cools, and returns to its original volume. This additional space in the container is taken up by the bladder 38, which has sufficient elasticity to return to its original shape while drawing air back into its interior from the ambient environment.

Shown in FIG. 3 is a top view of the cooler that shows the location of the two fill ports sealed with fill plugs 24 that are used to fill the system with fluid 28. In the preferred embodiment, two fill ports are used to allow escaping gas to exit through one port 23 while the coolant is entering the container 12 through the other fill port 23. The plugs 24 have integral O-rings that permit them to seal to container 12.

Shown in FIG. 4 is a rear view of the system showing one of the seal plugs 24 removed for clarity.

Figure 5:
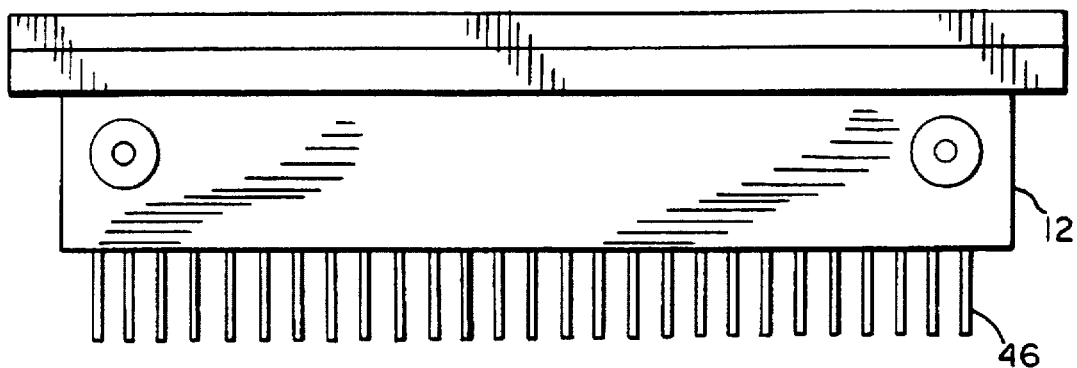
FIG. 5 is a top view of straight fins in place of pins.

FIG. 5 shows an alternative to the pin array 44 by using straight fins 46 either formed with the container 12 or bonded to the container 12 in a secondary operation.

Figure 6:
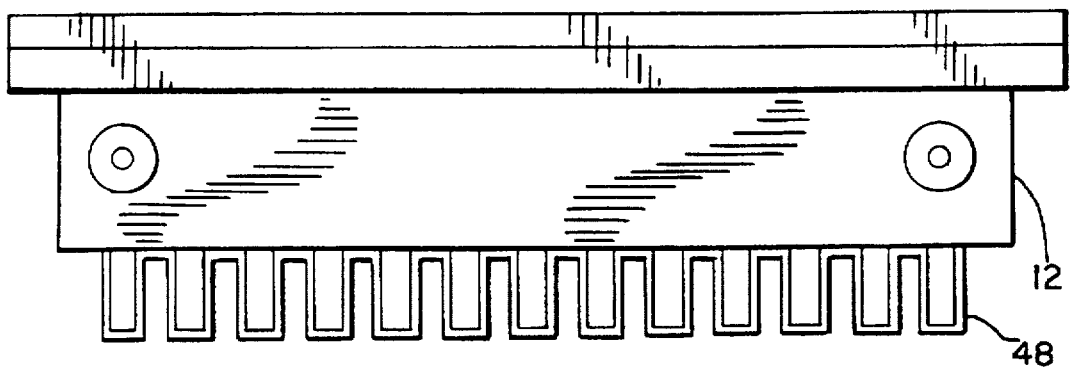
FIG. 6 is a top view of folded fins in place of pins.

FIG. 6 shows another alternative to the pin array 44 by using a folded fin 48 that inherently increases surface area due to its shape. The folded fin 42 preferably is bonded to the container 12 in a secondary operation.

While the invention has been shown and described with reference to a preferred embodiment thereof, it will be understood by those skilled in the art that various changes in form and detail may be made herein without departing from the spirit and scope of the invention as defined by the appended claims.

What is claimed is:

1. A light source cooling apparatus comprising:

a container, a light source positioned within the container, the container including a surface through which light from the light source is emitted from the container;

a liquid coolant located within the container and surrounding the light source, so that heat from the light source is transferred by said coolant to a surface of the container; and a compressible bladder located within the container, the bladder having a size which is controlled by volume changes of the coolant.

2. An apparatus according to claim 1 wherein the container is a rigid structure.

3. An apparatus according to claim 1 wherein the liquid coolant has a boiling point higher than any temperature reached by the coolant from heating by the light source.

4. An apparatus according to claim 1 wherein the bladder comprises a vent to an ambient environment such that fluid within the bladder is vented to the environment as the bladder is compressed.

5. An apparatus according to claim 1 further comprising fins in thermal contact with an outer surface of the container which provide additional surface area for transferring heat from the coolant to the ambient environment.

6. An apparatus according to claim 5 wherein the fins are constructed from a single piece of material.

7. An apparatus according to claim 6 wherein the fins are folded from the single piece of material into a corrugated shape.

8. An apparatus according to claim 5 wherein the fins are attached to an outer surface of the container by soldering.

9. An apparatus according to claim 1 wherein the surface of the container through which light passes is a transparent panel, which is hermetically sealed to the container.

10. An apparatus according to claim 1 further comprising a reflective plate positioned within the container such as to reflect light from the bulb toward the surface through which light passes.

11. An apparatus according to claim 1 further comprising a resealable fill port in a surface of the container through which the liquid coolant is introduced to the container.

12. A light source cooling apparatus comprising:

a container a light source positioned within the container, the container including a transparent panel through which light from the light source is emitted from the container, the container being hermetically sealed to the transparent panel;

a liquid coolant located within the container and surrounding the light source, so that heat from the light source is transferred by said coolant to a surface of the container, the coolant having a boiling point which is lower than any temperature reached by the coolant from heating by the light source; and a compressible bladder located within the container, the bladder including a vent to an external ambient environment such that volume changes of the coolant cause passage of fluid between an interior of the bladder and the ambient environment through said vent.

13. An apparatus according to claim 12 further including a reflective plate located within the container which redirects light from the bulb toward the transparent panel.

14. An apparatus according to claim 12 further comprising a fin array in thermal contact with an outer surface of the container, the fin array providing additional surface area for transferring heat from the coolant to the ambient environment.

* * * * *